(No Model.)

D. H. WALKER & L. DURAND
DOUGH KNEADER.

No. 261,283. Patented July 18, 1882.

WITNESSES.

INVENTORS.
D. H. Walker.
Louis Durand.
BY
ATTORNEY.

UNITED STATES PATENT OFFICE.

DEXTER H. WALKER AND LOUIS DURAND, OF NEW YORK, N. Y.

DOUGH-KNEADER.

SPECIFICATION forming part of Letters Patent No. 261,283, dated July 18, 1882.

Application filed October 4, 1881. (No model.)

*To all whom it may concern:*

Be it known that we, DEXTER H. WALKER and LOUIS DURAND, both of the city, county, and State of New York, have invented certain new and useful Improvements in Dough-Kneaders; and we hereby declare the same to be fully, clearly, and exactly described as follows, reference being had to the accompanying drawings, in which—

Figure 1:
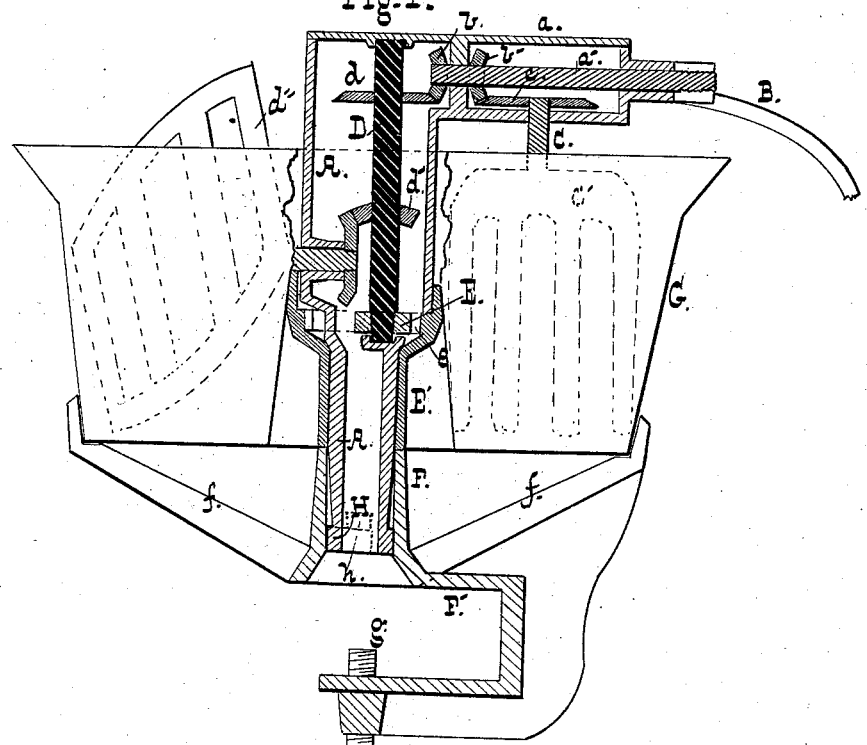
Figure 2:
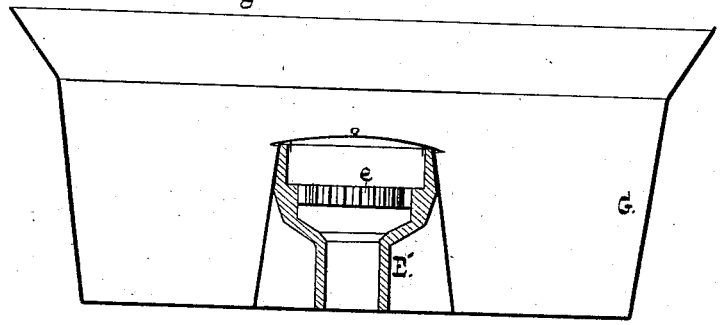
Figure 3:

Figure 1 is a central vertical sectional view of the device, partly in elevation. Fig. 2 is a sectional view of the pan and driver, and Fig. 3 is an elevation of the lower part of the center-pin.

Our invention relates to devices for kneading or mixing dough; and it consists in certain improvements upon that for which Letters Patent were granted to Louis Durand, June 15, 1880, No. 228,739.

The invention will first be described, and then pointed out in the claim.

In the drawings, A is a casing having a removable cover, $a$, and in it revolves in suitable bearings a shaft, $a'$, having a crank, B, by which it is driven. On the shaft $a'$ are keyed bevel-gear wheels $b\ b'$, the wheel $b'$ meshing with a wheel, $c$, on the shaft C, to which latter is secured the beater $c'$. The wheel $b$ engages with a wheel, $d$, on the vertical shaft D, which latter carries a wheel, $d'$, that drives the horizontal beater $d''$, as shown.

On the lower end of the shaft D is a pinion, E, which meshes with a wheel, $e$, that is formed on the inside of the casing E'. The lower end of this casing rests and turns upon a boss, F, integral with the base F'. The base is provided with radial arms $f$ for sustaining the rim of the pan G, which latter is securely soldered to the casing E'. A screw, $g$, serves to secure the casing to the edge of a table or similar support. At its lower end the casing A is somewhat tapered, and is provided with a pair of inclined lugs, H, that engage with similarly-inclined bearings $h$ on the base F', as shown.

In the operation the dough is placed within the pan, and the casing A is lowered through the part E' and into the boss F, the lugs H being made to pass between the bearings $h$. On partly turning the casing A the lugs jam tightly under the bearings, holding the casing rigidly. The crank being turned, motion is communicated to the vertical and horizontal beaters and to the pan, all being made to turn in the manner described in the above-named patent. When the mixing is complete the casing A is turned so as to release the lugs H, when it is removed and the pan is emptied.

Having thus described our invention, what we claim as new, and desire to secure by Letters Patent, is—

In combination with the base having radial arms and boss F, provided with inclined bearings, the casing E', having internal gearing, and being rigidly secured to the pan, and the casing A, inclosing the driving mechanism, and provided with inclined lugs at its lower end, substantially as set forth.

DEXTER H. WALKER.
LOUIS DURAND.

Witnesses:
G. BYRON SCAMMELL,
JOS. C. HUGHES.